(12) United States Patent
Yang et al.

(10) Patent No.: US 8,953,602 B2
(45) Date of Patent: Feb. 10, 2015

(54) NETWORK DATA STORING SYSTEM AND DATA ACCESSING METHOD

(75) Inventors: Jinsheng Yang, Zhejiang (CN); Lei Pan, Zhejiang (CN); Zhengrong Tang, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1000 days.

(21) Appl. No.: 12/447,036

(22) PCT Filed: Aug. 27, 2007

(86) PCT No.: PCT/CN2007/070564
§ 371 (c)(1),
(2), (4) Date: Nov. 12, 2009

(87) PCT Pub. No.: WO2008/049353
PCT Pub. Date: May 2, 2008

(65) Prior Publication Data
US 2010/0061375 A1    Mar. 11, 2010

(30) Foreign Application Priority Data

Oct. 26, 2006    (CN) .......................... 2006 1 0150325

(51) Int. Cl.
  *H04L 12/28*    (2006.01)
  *H04L 12/56*    (2006.01)
  *H04L 12/701*   (2013.01)
  *G06F 17/30*    (2006.01)
  *H04L 29/08*    (2006.01)

(52) U.S. Cl.
  CPC .......... *H04L 45/00* (2013.01); *G06F 17/30197* (2013.01); *H04L 67/1097* (2013.01)

USPC ........................................ 370/392; 370/395.7

(58) Field of Classification Search
None
See application file for complete search history.

(56) References Cited

U.S. PATENT DOCUMENTS

| 5,737,732 A  | 4/1998 | Gibson et al. |
| 5,970,496 A  | 10/1999 | Katzenberger |
| 7,363,307 B1 | 4/2008 | Yamagishi et al. |
| 7,499,905 B2 | 3/2009 | Jaschek et al. |

(Continued)

FOREIGN PATENT DOCUMENTS

| CN | 1333966(A) | 1/2002 |
| CN | 1463522(A) | 12/2003 |

(Continued)

OTHER PUBLICATIONS

The Chinese Office Action mailed Mar. 13, 2009 for Chinese patent application No. 200610150325.3, a counterpart foreing application of U.S. Appl. No. 12/447,036, 7 pages.

(Continued)

*Primary Examiner* — Suk Jin Kang
(74) *Attorney, Agent, or Firm* — Lee & Hayes, PLLC

(57) ABSTRACT

The present disclosure provides a network data storage system and a network data access method. The disclosed network data storage system includes: a data node, used for storing a data unit; a metadata node, used for storing and managing routing information and providing the routing information according to a data processing request of a client; and a data management node, used for processing the requested data unit in the data node according to a data access request of the client. The disclosed system and method may improve access performance of network data, enhance expansibility of a system, and lower expansion cost.

20 Claims, 3 Drawing Sheets

(56) References Cited

U.S. PATENT DOCUMENTS

| | | |
|---|---|---|
| 7,509,645 B2 | 3/2009 | Coates et al. |
| 7,523,130 B1 | 4/2009 | Meadway et al. |
| 7,590,618 B2 | 9/2009 | Abraham |
| 2002/0199017 A1 | 12/2002 | Russell |
| 2003/0093655 A1* | 5/2003 | Gosior et al. ............ 712/228 |
| 2003/0120896 A1* | 6/2003 | Gosior et al. ............ 712/32 |
| 2003/0208658 A1 | 11/2003 | Magoshi |
| 2003/0221124 A1 | 11/2003 | Curran et al. |
| 2003/0223378 A1 | 12/2003 | Ishwar et al. |
| 2004/0015486 A1 | 1/2004 | Liang et al. |
| 2004/0064463 A1 | 4/2004 | Rao et al. |
| 2004/0078658 A1 | 4/2004 | Park et al. |
| 2004/0122917 A1* | 6/2004 | Menon et al. ............ 709/219 |
| 2004/0153481 A1* | 8/2004 | Talluri ............ 707/200 |
| 2005/0207449 A1* | 9/2005 | Zhang et al. ............ 370/486 |
| 2006/0031230 A1 | 2/2006 | Kumar |
| 2007/0143455 A1* | 6/2007 | Gorman et al. ............ 709/223 |
| 2007/0150492 A1* | 6/2007 | Shitomi ............ 707/100 |
| 2007/0214314 A1 | 9/2007 | Reuter |
| 2007/0233868 A1* | 10/2007 | Tyrrell et al. ............ 709/226 |
| 2007/0256081 A1* | 11/2007 | Comer ............ 719/316 |
| 2012/0047221 A1* | 2/2012 | Georgiev ............ 709/213 |

FOREIGN PATENT DOCUMENTS

| | | |
|---|---|---|
| CN | 1504894 | 6/2004 |
| CN | 1728665 | 2/2006 |
| JP | 06266600 | 9/1994 |
| JP | 063323782 | 12/1994 |
| JP | 2003167815 | 6/2003 |
| JP | 2003248611 A | 9/2003 |
| JP | 2003256144 | 9/2003 |
| JP | 2003296167 | 10/2003 |
| JP | 2004171224 | 6/2004 |
| JP | 2004227127 A | 8/2004 |
| JP | 2004318743 A | 11/2004 |
| JP | 2005322020 A | 11/2005 |
| JP | 2006003962 A | 1/2006 |
| JP | 2006164169 | 6/2006 |

OTHER PUBLICATIONS

The Chinese Office Action mailed Apr. 1, 2011 for Chinese patent application No. 200610150325.3, a counterpart foreing application of U.S. Appl. No. 12/447,036, 7 pages.

Translated the Japanese Office Action mailed Aug. 3, 2012 for Japanese patent application No. 2009-534958, a counterpart foreign application of U.S. Appl. No. 12/447,036, 8 pages.

Hartman, et al., "The Zebra Striped Network File System", Proceedings of the Fourteenth ACM Symposium on Operating Systems Principles (SOSP 1993), pp. 29-43, Dec. 5, 1993.

The Japanese Office Action mailed Mar. 8, 2013 for Japanese patent application No. 2009-534958, a counterpart foreign application of U.S. Appl. No. 12/447,036, 16 pges.

Shepler, et al., "Network File System (NFS) version 4 Protocol", Internet Engineering Task Force (IETF) FRC3530, pp. 1-61, Apr. 2003, retrieved from the internet at http://www.ietf.org/rfc/rfc3530.txt.

The Extended European Search Report mailed Apr. 7, 2014 for European Patent Application No. 07785461.0, 6 pages.

Translated the Japanese Office Action mailed Jan. 7, 2014 for Japanese patent application No. 2012-243816, a counterpart foreign application of U.S. Appl. No. 12/447,036, 6 pages.

Translated the Japanese Office Action mailed Dec. 17, 2013 for Japanese patent application No. 2009-534958, a counterpart foreign application of U.S. Appl. No. 12/447,036, 11 pages.

Yamauchi, "Architecture of Server in UNIX (Solaris 2.5), Chapter 2 DNS Server", Open Design, vol. 4, No. 1, pp. 14-20, CQ Publishers, Co., Ltd., Japan, Feb. 1, 1997.

* cited by examiner

NETWORK DATA STORING SYSTEM AND DATA ACCESSING METHOD

This application claims priority from Chinese Patent Application No. 200610150325.3, filed in China Patent Office on Oct. 26, 2006, entitled "NETWORK DATA STORAGE SYSTEM AND DATA ACCESSING METHOD", and incorporates the Chinese patent application in its entirety by reference.

TECHNICAL FIELD

The present disclosure relates to fields of data storage and management, and particularly to systems for storing network data, and methods for accessing network data.

BACKGROUND ART

A history of development of IT technology saw a transition from a stage that centers on computer technology and driven by the development of processors to a stage that centers on transmission technology. The transition promoted the development and popularity of computer network. The information of an increasing number of business activities become digitized, leading to an explosive increase in digitized information and a growing demand for storage techniques of the IT technology. New characteristics such as mentioned below have emerged in data storage applications:

(1) Data has become the most valuable asset. Losing data can bring inestimable and even destructive damages to a company.

(2) The total amount of data has increased explosively.

(3) Around-the-clock service has become the trend. 365× 24 hour service becomes the norm in e-commerce and most network service applications, and requires existing data storage system to possess excellent high availability.

(4) Storage management and maintenance are required to be centralized, automatic, and intelligent.

(5) Storage technique needs to be platform independent.

Conventional storage system uses DAS (Direct Attached Storage), i.e., storing through a direct connection, which is also called SAS (Server-Attached Storage). In this approach, a storage device is directly connected to a server through a cable (usually a SCSI connecting cable). An I/O (input/output) request is sent to the storage device directly. This storing approach relies on the server, while the storage device is simply a pile of hardware without any storage operating system. Because of limitations for server bus technology, systems using DAS have poor expansibility. If the number of user connections increases, the server may become a performance bottleneck of the entire system because the following reasons.

(1) Bandwidth limitation of a computer. Although the development of computer technology has led to an increase in bus bandwidth of a computer, the increase still fails to keep up with bandwidth requirement of modern storage applications.

(2) Memory capacity limitation of a computer. As memory capacity of a computer is limited, if there are continuously large numbers of data access requests, the memory capacity of the computer will be saturated quickly, thus failing to process remaining requests for data transmission.

(3) Overhead for management of a file system may also increase data access time.

A large number of existing corporate applications rely heavily on database technology, and use centralized database server for centralized data storage. These applications are generally a single point and a performance bottleneck of the associated system. In addition to being costly and hard to expand, these corporate applications also have particular difficulties in concurrently processing a large amount of data online. Therefore, conventional approaches using centralized data storage and management are no longer able to satisfy rapidly growing demands.

DESCRIPTION OF THE INVENTION

The present disclosure provides a system for storing network data in order to solve the problem of poor expansibility, high expansion cost and poor data access performance that are inherent in the existing network data storage systems.

Based on the same technical concept, the present disclosure further provides a method for accessing network data.

The present disclosure provides a system for storing network data. The system includes:

a data node, used for storing a data unit;

a metadata node, used for storing and managing routing information and providing the routing information according to a data processing request of a client; and a data management node, used for processing the requested data unit in the data node according to a data access request of the client.

The metadata node, the data management node, and the data node are connected to each other in a tree structure. The metadata node is a root node of the tree structure. The root node has one or more data management nodes below connected thereto. Each data management node connects to one or more data nodes below.

In the above-described system, the routing information stored in the metadata node includes:

routing information from the metadata node to the data management node; and routing information from the data management node to the data node.

The metadata node further stores a routing algorithm of the data unit. The routing algorithm is for computing an identifier of the data node storing the data unit and position information of the data unit in the data node.

In the above-described system, the data management node may have data access service and/or redundancy strategy deployed therein.

Herein, a data unit stored in the data node is the smallest data set for an application.

Inside the data unit are multiple files and/or directories. The files inside the data unit may include data files and/or index files.

The above-described system further includes a log management node, which is used for storing a log file, and providing log management service.

The above-described system further includes a lock node used for storing a lock file and providing lock management service.

The present disclosure also provides a method for accessing network data. The method includes the following steps:

in a client, sending a request for accessing a data unit to a metadata node, and receiving routing information of a data management node from the metadata node;

in the client, sending the request for accessing the data unit to the data management node according to the routing information of the data management node; and in the data management node, obtaining routing information of a data node which stores the data unit from the metadata node upon receiving the request, and processing the data unit in the data node according to the routing information of the data node and operation requested by the client.

In the above-described method, after the metadata node receives the request for accessing the data unit from the client, the metadata node sends the routing information of the data management node to the client using a process having the following steps:

in the metadata node, obtaining information of the data unit from the request for accessing the data unit, and obtaining an identifier of the data unit based on a mapping relationship between the information of the data unit and the identifier of the data unit;

computing an identifier of the data node which stores the data unit from the identifier of the data unit based on a routing algorithm of the data unit; and obtaining an identifier of the data management node based on a mapping relationship between the identifier of the data node and the identifier of the data management node, and providing the identifier of the data management node to the client.

In the above-described method, the metadata node provides the routing information of the data node to the data management node using a procedure having the following steps:

obtaining an identifier of the data unit from a request sent from the data management node; according to a routing algorithm of the data unit and based on the identifier of the data unit, computing an identifier of the data node which stores the data unit and position information of the data unit in the data node; and providing the identifier of the data node and the position information to the data management node.

In the above-described method, the data management node separates storing operation from computing operation.

The storing operation is executed using a thread pool corresponding to a storing job queue, while the computing operation is executed using a thread pool corresponding to a computing job queue.

The above-described method further includes the following step:

upon receiving a data operation command from the data management node, the data node processes the data unit by a local file system in the data node according to the operation command.

In the above-described method, the data unit has a unique identifier. The identifier of the data unit is computed through mapping using the identifier of the data node storing the data unit and the position information of the data unit in the data node.

In the above-described method, processing the data unit in the data node further includes the following steps:

submitting a copy of a to-be-written block to a log file;

submitting the to-be-written block to the local file system in the data node upon successfully submitting the copy of the to-be-written block to the log file; and deleting the copy of the block from the log file if successfully submitting the to-be-written block to the file system, and keeping the copy otherwise.

If the system recovers to a normal status from an abnormal status, data recovery is performed according to the block's copy recorded in the log file.

The above-described method further includes the step of:

lock-protecting access to the data unit using a file lock of the data node and/or a file lock of the network file system.

The present invention may have the following benefits:

(1) The disclosed system for storing network data stores data into network nodes of a three-level structure in a distributed manner, and provides a unified access management and routing, thus supporting linear expansion and upgrade. Therefore, compared with the existing technology, the disclosed system has better expansibility and lower expansion cost.

(2) The disclosed mechanism for accessing network data, being based on the above distributed data storing system, adopts a two-level routing algorithm, and allows the position of a data file to be transparent to a client. A distributed design of a three-level structure allows a data management node in the middle level to share processing operations for data access, and can thus improve the access performance of network data by tactfully configuring the three-level structure.

(3) The present disclosure further adopts journaling technology to support transaction processing and improve consistency and integrity of network data access.

(4) The present disclosure further employs a lock management function to solve the problem of file lock failure in a network file system.

EXEMPLARY EMBODIMENTS

The present invention is described in details using exemplary embodiments and figures.

Figure 1:
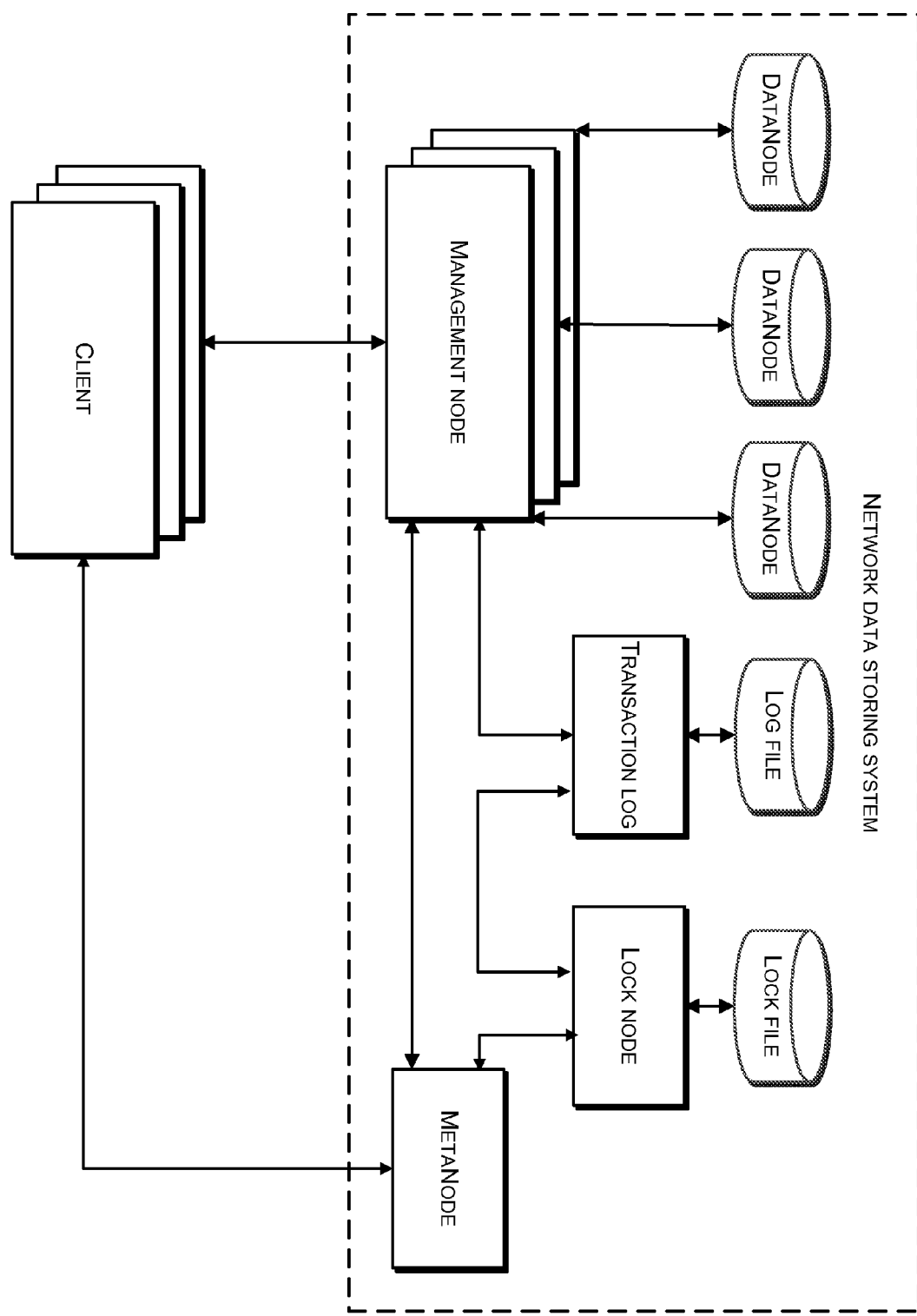
FIG. 1 shows a schematic structural diagram of an exemplary system for storing network data in accordance with the present disclosure.

FIG. 1 shows a schematic structural diagram of an exemplary system for storing network data in accordance with the present disclosure. The data storing system includes the following:

DataNode: a data node, which is a node in a network used for storing raw data and indices. The raw data is stored in DataNode in form of data units.

Management Node: a data management node, which is a node in the network acting as a middle level and used for providing routine services such as indexing and redundancy strategy. Management Node manages a group of related DataNodes.

MetaNode: a metadata node, which manages names, spaces and mapping relationships of the data nodes, and is a node in the network used for providing basic routing information. Two routing relations primarily maintained by MetaNode are routing from MetaNode to Management Node (i.e., first-level route), and routing from Management Node to DataNode (i.e., second-level route).

Transaction Log: a transaction management node based on journaling technology, generally deployed in Management Node to store log files and used for achieving transaction data protection.

Lock Node: a global network node, which stores a data lock in form of a file, and is used for achieving lock management of data access.

Figure 2:
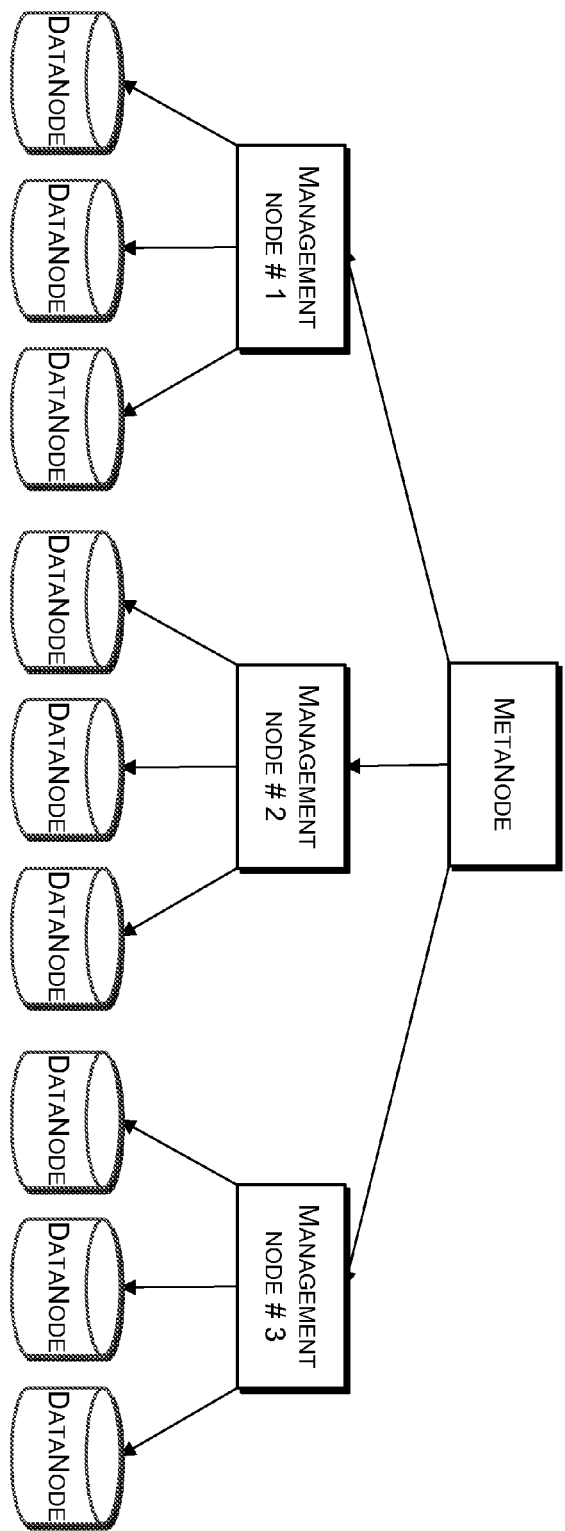
FIG. 2 shows a schematic diagram illustrating a tree structure of an exemplary system for storing network data in accordance with the present disclosure.

Architecture of the network data storage system in FIG. 1 is organized in a tree structure as illustrated in FIG. 2.

FIG. 2 shows a schematic diagram illustrating a tree structure of an exemplary system for storing network data in accordance with the present disclosure.

As shown in the figure, nodes in the network data storage system are logically divided into three levels. From the lowest level to the top level are DataNode, Management Node, and MetaNode. MetaNode acts as a root node and has multiple leaf nodes Management Node, while each Management Node in turn has multiple DataNode as its leaf nodes.

A network data storage system in the foregoing exemplary embodiment may be configured using the following procedure.

Step one: determine a data unit, assigns an ID to the data unit, and stores the data unit in DataNode in a distributed manner.

A data unit in this exemplary embodiment refers to an abstract data set transcending file system levels. Based on business characteristics and business needs, a data unit can be defined as a minimum data set which can be managed separately. Most requests and processing of corporate data have a distinct locality characteristic. For example, categorizing, indexing, receiving, and sending emails in an email system are achieved within a space of a fixed name such as an email account. In this case, an email account may be treated as a data unit.

A data unit may contain multiple files or directories therein, e.g., data files, index files, and file directories. These files and directories are managed by a local file system within the DataNode which stores the data unit.

An ID of a data unit uniquely identifies the data unit. An ID of a data unit includes two pieces of information, namely an ID of DataNode storing the data unit, and specific position information of the data unit in DataNode. These two pieces of information can be computed from the ID of the data unit using a routing algorithm of the data unit. An ID of a data unit therefore implicitly includes a correspondence relationship between the data unit and DataNode storing the data unit.

Step two: determine routing algorithm and routing information, and stores the information in MetaNode.

The routing information maintained by MetaNode includes the following: the information of the route from MetaNode to Management Node (i.e., first-level routing information), and the information of route from Management Node to DataNode (i.e., second-level routing information). These two kinds of routing information are implemented using mapping relationships and mapping algorithm as follows:

Establish a mapping relationship table between the data unit information (e.g., a name of a data unit) and an ID of associated data unit, and a mapping relationship table between DataNode ID and Management Node ID; and configure a routing algorithm of the data unit, such that using the routing algorithm the ID of DataNode storing the data unit and the specific position information of the data unit in DataNode can be obtained from the ID of the data unit.

The process of implementing a first-level route may include the following: obtain a route from MetaNode to Management Node by applying in turns the mapping relationship table between the data unit information and the ID of the data unit, the routing algorithm of the data unit, and the mapping relationship table between DataNode ID and Management Node ID.

The process of implementing a second-level route includes: send a request from Management Node to MetaNode, and obtain a route from Management Node to DataNode storing the requested data unit according to the routing algorithm of the data unit by MetaNode.

Step three: deploy Management Node as follows.

Deploy in Management Node data access services (e.g., indexing service), and possibly also a redundancy strategy; and Adopt in Management Node a technique of separating storing (i.e., I/O-bound tasks) and computing (i.e., CPU-bound tasks) to divide tasks into two queues, namely a computing task queue and a storing task queue, which are completed by two separate thread pools concurrently to fully utilize CPU and I/O resources.

Figure 3:
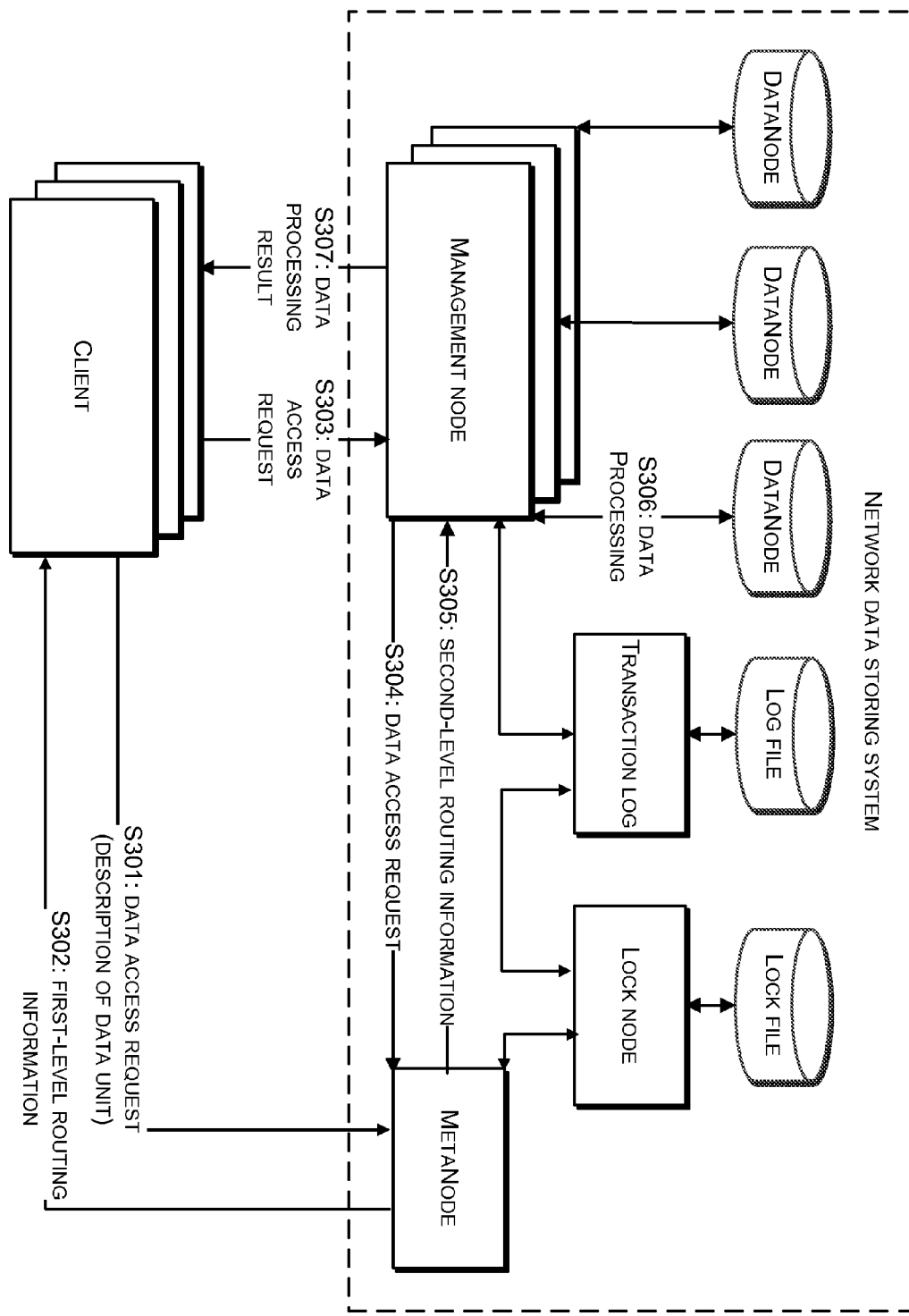
FIG. 3 shows a schematic diagram illustrating an exemplary process of accessing network data in accordance with the present disclosure.

Based on the network data storage system in the foregoing exemplary embodiment, a process of accessing network data is shown in FIG. 3.

FIG. 3 shows a schematic diagram illustrating an exemplary process of accessing network data in accordance with the present disclosure. The process includes the following steps.

At S301, a client sends a request for accessing data to MetaNode, providing descriptive information of a data unit (e.g., a name of the data unit) that is being requested for access.

At S302, the MetaNode returns first-level routing information to the client, providing position information of a Management Node which is responsible for managing the data unit.

The MetaNode obtains the descriptive information of the data unit from the request of the client, and obtains an ID of the data unit requested by the client based on a mapping relationship table between the description information of the data unit and the ID of the data unit. Based on a routing algorithm of the data unit, an ID of a DataNode storing the data unit is computed from the ID of the data unit. An ID of a Management Node which manages the DataNode is subsequently obtained using a mapping relationship table between DataNode ID and Management Node ID. The acquired ID of the Management Node is then sent to the client by the MetaNode.

At S303, the client sends the request for accessing data to the Management Node upon finding the Management Node using the first-level routing information.

At S304, the Management Node requests the MetaNode for the position of the data unit in a network according to the identity of the client and the information of the data unit in the request.

In the above S302, when the MetaNode returns the first-level routing information to the client, the MetaNode may also return the ID of the client-requested data unit at the same time. In this case, the client's request for accessing data at S303 includes the ID of the data unit that is being requested for access, and the request from the Management Node to the MetaNode at S304 also includes the ID of the data unit.

At S305, the MetaNode returns second-level routing information to the Management Node, informing the position of the data unit in the network.

The MetaNode obtains the ID of the data unit from the request sent by the Management Node, computes the DataNode ID and the specific position of the data unit in the DataNode from the ID of the data unit using the routing algorithm of the data unit, and returns this information to the Management Node.

At S306, the Management Node finds the DataNode storing the data unit and the position of the data unit in the DataNode based on the position information, and processes the data in the data unit according to the request of the client.

The DataNode processes the data unit through a local file system according to an operation command of the Management Node.

At S307, the Management Node returns a data processing result to the client as needed.

In the above process of accessing data, Management Node adopts a technique to internally separate storing (I/O-bound task) and computing (CPU-bound task) and divide tasks into two queues, a computing task queue and a storing task queue, which are concurrently completed by two separate threads respectively.

The above process of accessing data also uses transaction processing mechanisms including journaling mechanism and lock technology in the exemplary embodiments of the present invention to ensure the reliability of network data access.

Many file operations are non-atomic activities. Particularly in a process crossing multiple files or multiple nodes, consistency and integrity of data are prone to damage, leading to anomalous conditions such as abnormal system shutdown. Borrowing the idea of log protection mechanism provided by database and the file system of an operating system, the present invention provides a transaction protection mechanism for accessing data that have a non-database structure as in the exemplary embodiments.

If a data unit in the exemplary embodiment of the present disclosure is accessed (e.g., an access or storing operation), a copy of the to-be-written block is written into a log file. When the associated I/O data sent to the log file has been completely transmitted (i.e., data has been successfully submitted to the log file), the block is written to a local file system of DataNode. When I/O data being sent to the file system has been completely transmitted (i.e., data has been successfully submitted to the file system), the block's copy is removed from the log file. If transmission of the I/O data to the file system has failed, the log file keeps the block's copy.

If the system crashes or is restarted as needed, the system first reads the log file, and performs recovery according to the block's copy which has been recorded in the log file so that the system can recover the normal state prior to the occurrence of the exception.

In order to enhance isolation of a transaction, the exemplary embodiment of the present invention further provides a lock mechanism. Isolation of a transaction is generally ensured by locking a resource that is being accessed by the transaction. Moreover, locking technique is a very helpful tool for ensuring characteristics, high concurrency and high reliability of a file transaction.

The exemplary embodiment of the present invention uses combines Dotlock file lock widely used in local hard disk single node and POSIX-compliant Flock( ) or Fcntl( ) of BSD-based systems used by network file systems (NFS). A specific implementation is as follows.

Acquire a Dotlock first. At this step, acquisition by multiple nodes is possible. Upon successful acquisition, attempt to acquire Flock( ) or Fcntl( ). These locks are saved in a global node in form of a file. During recovery, the system checks and releases any suspended lock. The lock granularity of may be a lock for a data block, a file, a directory, or even a DataNode.

The following uses an example of adding storage capability to a high capacity email system for an illustration.

Step one: conduct data plan and determine the minimum data unit managed by a system.

An email address (i.e., an email account) is generally made up of a username and a domain name, with a symbol @ therebetween. An email account may be counted as a minimum data unit, or a domain name may be treated as a data unit. The present exemplary embodiment selects an email account to be a data unit.

Step two: determine a routing algorithm and a routing table.

The aim for planning a routing algorithm is to resolve the issue of how to find the storage location of a mailbox content based on an email account provided by a user. In order to support the ever-expanding capacity of a system, the exemplary embodiment uses 32-bit address space for routing. Accordingly, maximally 1G (i.e., about one billion) number of users can be supported. This 32-bit address space is referred to as RID (Route ID), and is used for uniquely identifying an email account. The present exemplary embodiment assumes that one DataNode can support up to 1M ($2^{20}$=1,048, 576) users. Therefore, the size of the address space for DataNode is 1M, wherein a specific address may generally be represented by a directory of a local file system. The present exemplary embodiment uses the lower 20 bits for mapping specific directories, referred to as internal addresses DataID in a DataNode. Each DataNode has a unique sequence number NSN (Node Sequence Number), which is represented by the upper 12 bits of the 32-bit RID. Specifically, RID >>20=NSN, i.e., right shift the RID by 20 bits obtains NSN.

Examples of routing tables stored in MetaNode are shown in TABLE 1 and TABLE 2.

TABLE 1

Mapping Relationship between Email Accounts and Email RIDs

| Mail Address | RID |
|---|---|
| xxx@yyy.com | 11033234 |
| aaa@bbb.com | 1033134 |
| . . . | . . . |

TABLE 2

Mapping Relationship between DataNode ID and Management Node ID

| Node NSN | Management Node |
|---|---|
| 0, 1, 2 | worker-1 |
| 3, 4, 5 | worker-2 |
| . . . | . . . |

TABLE 2 indicates that each Management Node manages three nodes. A request from the address xxx@yyy.com is processed by Management Node having identifier worker-1.

Step three: conduct capacity plan upon establishing the data plan and routing strategy.

When there are few users, one Management Node and one DataNode (which is with sequence number of 0 and responsible for managing 0-1M users) may be deployed. As the number of users increases, a new DataNode is added when one DataNode can no longer satisfy storage needs. The sequence number of the new DataNode is assumed to be 1, i.e., the upper 12 bits of associated RID is 000000000001. The new DataNode is responsible for managing users between 1M and 2M of the lower 20 bits of the RID. As illustrated above, as business continues to expand, the system can continue to expand linearly, thus achieving storage of massive amount of data.

Step four: deploy MetaNode.

Routing information tables such as TABLE 1 and TABLE 2 may be stored in a database of MetaNode or stored in form of a file. As routing information table is not large in size, the entire routing table may be placed in an internal memory after the server has started up. This allows fast response to client requests. Different strategies may be adopted for different applications. For example, for a simple application with well organized data rules, MetaNode may be simplified to be a two-level hash algorithm which is implemented using unique data ID provided by the application.

Step five: deploy services of Management Node and designate the configuration to establish an index.

Data searching function is added to Management Node for indexing data need to be stored. Index file and data file are stored in relevant data nodes. If business-related data processing is required, a related logical job, acting as service, is deployed in associated server. Management Node uses a technique that separates storing and computing to fully explore system capability.

With future development of business, the system may continuously expand its capacity as demanded. As the number of users increases, DataNodes can be added continuously. Each time three DataNode are added, a new Management Node may be deployed. With respect to MetaNode, generally only one server is needed. Alternatively, in order not to become a single point of the system, backup mechanism may be used, and additional MetaNode servers may be added for backup.

Above preferred embodiment is aimed at a relatively simple email system. The application scenarios of the network data storage system of the present invention as illustrated by the exemplary embodiments, however, are not limited to this particular type of application. The network data storage system illustrated by the exemplary embodiments of the present disclosure is particularly suitable for use in B2B e-commerce platform and software. Applications of this type are generally company and user centered, and has a great amount of online transaction processing. Therefore, a user or a company may be treated as a data unit aggregate. Because data is primarily possessed internally, other users are not allowed to access the data. Treating the data as a data unit aggregate for managing ensures that the company data is physically independent and isolated, and not mingled with that data of other users. This also supports online search and business processing at the same time.

Compared with database, this scheme has a clear advantage. A database cannot create a set of databases for each company user, and generally must put all corporate application data of the same kind into one table without physically implementing safe isolation, thus requiring associated application to handle such problems as illegal access. When there are a large number of users, the database method may cause a severe performance problem.

Evidently, a technician in the art can alter or modify the present invention in many different ways without departing from the spirit and the scope of this invention. Accordingly, it is intended that the present invention cover all modifications and variations which fall within the scope of the claims of the present invention and their equivalents.

The invention claimed is:

1. A system comprising:
a data node that stores a data unit; and
a metadata node that:
receives a request for accessing the data unit;
obtains information of the data unit from the request for accessing the data unit;
obtains an identifier of the data unit based on a mapping relationship between the information of the data unit and the identifier of the data unit, the identifier of the data unit including information of an identifier of the data node and position information of the data unit in the data node;
computes the identifier of the data node at least based on the identifier of the data unit; and
obtains an identifier of a data management node based on a mapping relationship between the identifier of the data node and the identifier of the management node.

2. The system as recited in claim 1, wherein:
the metadata node, the data management node, and the data node are connected to each other in a tree structure;
the data management node processes the data unit in the data node;
the metadata node is a root node of the tree structure and is connected to one or more data management nodes; and
each data management node is connected to one or more data nodes.

3. The system as recited in claim 1, wherein the identifier of the data node is computed based on the identifier of the data unit and the position information of the data unit in the data node.

4. The system as recited in claim 1, wherein the data management node has a data access service and/or a redundancy strategy deployed therein.

5. The system as recited in claim 1, wherein the data unit stored in the data node is a smallest data set for a business application.

6. The system as recited in claim 5, wherein the data unit contains therein multiple files and/or directories.

7. The system as recited in claim 6, wherein the files in the data unit include a data file and/or an index file.

8. The system as recited in claim 1, wherein the system further comprises:
a log management node that stores a log file and provides log management service.

9. The system as recited in claim 1, wherein the system further comprises:
a lock node that stores a lock file and provides lock management service.

10. A method comprising:
receiving a request for accessing a data unit from a client;
obtaining information of the data unit from the request for accessing the data unit;
obtaining an identifier of the data unit based on a mapping relationship between the information of the data unit and the identifier of the data unit, the identifier of the data unit including information of an identifier of the data node and position information of the data unit in the data node;
computing the identifier of the data node at least based on the identifier of the data unit;
according to a routing algorithm of the data unit and based on the identifier of the data unit, computing the position information of the data unit in the data node;
obtaining an identifier of a data management node based on a mapping relationship between the identifier of the data node and the identifier of the management node; and
providing the identifier of the data node and the position information of the data unit in the data node to the data management node.

11. The method as recited in claim 10, further comprising:
providing the identifier of the data management node to the client.

12. The method as recited in claim 10, further comprising:
processing at the data node the data unit using a local file system in the data node according to an operation command.

13. The method as recited in claim 10, wherein the identifier of the data unit is unique.

14. The method as recited in claim 13, wherein the identifier of the data unit is computed through mapping using the identifier of the data node storing the data unit and the position information of the data unit in the data node.

15. The method as recited in claim 10, further comprising:
submitting a copy of a to-be-written block to a log file;
submitting the to-be-written block to a local file system in the data node upon successfully submitting the copy of the to-be-written block to the log file; and deleting the copy of the block from the log file if successfully submitting the to-be-written block to the local file system, and keeping the copy otherwise.

16. The method as recited in claim 15, further comprising performing data recovery according to the copy of the block recorded in the log file if the system recovers to normal status from an abnormal status.

17. The method as recited in claim 10, wherein the method further comprises:
  lock-protecting access to the data unit using a file lock of the data node and/or a file lock of the network file system.

18. A method comprising:
  receiving a request for accessing a data unit from a client, the request including information of the data unit; and
  returning to the client routing information of a data node which stores the data unit upon receiving the request and routing information of a data management node that processes the data unit in the data node, the returning including:
    based on a mapping relationship between the information of the data unit and an identifier of the data unit, obtaining the identifier of the data unit, the identifier of the data unit being computed through mapping by using an identifier of the data node storing the data unit and position information of the data unit in the data node;
    computing the identifier of the data node at least based on the identifier of the data unit;
    based on a mapping relationship between the identifier of the data node and an identifier of a data management node, obtaining the identifier of the data management node; and
    providing the identifier of the data management node to the client.

19. The method as recited in claim 18, wherein:
the metadata node, the data management node, and the data node are connected to each other in a tree structure;
the metadata node is a root node of the tree structure, the root node connecting to one or more data management nodes below; and
each data management node connects to one or more data nodes below.

20. The method as recited in claim 18, wherein:
the data management node separates a storing operation from a computing operation;
the storing operation is executed using a thread pool corresponding to a storing job queue; and
the computing operation is executed using another thread pool corresponding to a computing job queue.

* * * * *